US006754327B1

United States Patent
Baker et al.

(10) Patent No.: US 6,754,327 B1
(45) Date of Patent: Jun. 22, 2004

(54) STANDALONE ACD SYSTEM WITH NATIVE SIGNALING SYSTEM 7 CAPABILITY

(75) Inventors: Daniel F. Baker, Rolling Meadows, IL (US); Thaddeus Rafacz, Lisle, IL (US); Daniel L. Greene, Aurora, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 09/136,223

(22) Filed: Aug. 19, 1998

(51) Int. Cl.[7] .................................................. H04M 7/00
(52) U.S. Cl. ............. 379/219; 379/220.01; 379/221.01; 379/221.08
(58) Field of Search .............................. 379/93.01, 201, 379/219, 229, 230, 265, 266, 309, 221.08, 221.09, 221.12

(56) References Cited

U.S. PATENT DOCUMENTS

| | | | | |
|---|---|---|---|---|
| 4,627,047 A | | 12/1986 | Pitroda et al. ................. 370/58 |
| 5,268,903 A | | 12/1993 | Jones et al. ............... 370/110.1 |
| 5,377,186 A | * | 12/1994 | Wegner et al. ............... 370/220 |
| 5,448,633 A | * | 9/1995 | Jamaleddin et al. ......... 379/201 |
| 5,790,647 A | * | 8/1998 | Gessel ......................... 379/201 |
| 5,812,639 A | * | 9/1998 | Bartholomew et al. ...... 370/352 |
| 5,953,399 A | * | 9/1999 | Farris et al. ................. 379/201 |
| 5,974,133 A | * | 10/1999 | Fleischer, III et al. ....... 379/230 |
| 6,038,309 A | * | 3/2000 | Ram et al. ................... 379/229 |
| 6,044,142 A | * | 3/2000 | Hammarstrom et al. .... 379/223 |
| 6,072,857 A | * | 6/2000 | Venkateshwaran et al. .... 379/9 |
| 6,094,479 A | * | 7/2000 | Lindeberg et al. ...... 379/220.01 |
| 6,169,904 B1 | * | 1/2001 | Ayala et al. ................. 455/461 |
| 6,185,287 B1 | * | 2/2001 | Miloslavsky ................. 379/219 |
| 6,188,761 B1 | * | 2/2001 | Dickerman et al. ..... 379/265.01 |

OTHER PUBLICATIONS

Newton, Newton's Telecom Dictionary, Mar. 98, 14th Edition, p. 526.*

* cited by examiner

Primary Examiner—Bing Bui
(74) Attorney, Agent, or Firm—Welsh & Katz, Ltd.

(57) ABSTRACT

A method and apparatus are provided for exchanging control information between a automatic call distributor and a public switched telephone network. The method includes the steps of identifying a subscriber channel between the automatic call distributor and public switched telephone network for use during a communication transaction and exchanging control information regarding the identified data channel over any of a plurality of available control channel between the public switch telephone network and automatic call distributor using nonassociative signaling.

27 Claims, 1 Drawing Sheet

STANDALONE ACD SYSTEM WITH NATIVE SIGNALING SYSTEM 7 CAPABILITY

FIELD OF THE INVENTION

The field of the invention relates to telephony systems and more particularly to automatic call distributors used with private networks.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the automatic call distributor (ACD) may distribute the calls based upon which agent position (telephone) has been idle the longest.

In order to distribute incoming calls from the PSTN to the available agents, the interaction of a controlling computer with a switching fabric of the ACD becomes essential. Often a connection of the ACD to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue of the selected agent (or group of agents) or directly to the selected agent. At the same time that the call is delivered to the agent, the controller sends an identifier of the selected agent and ANI number of the customer to a controller of the database (the host). The host, in turn, displays the customer records on a computer monitor of the terminal of the selected agent at the same time the call is delivered.

While the existing method of ACD operation is relatively satisfactory, the interface between the public switched telephone network and ACD typically functions under a digital signaling system #1 (DSS1) format. The DSS1 format is not adapted for reliability or speed. While translator boxes may be available, the DSS1 gateway still provides a serious impediment to ACD speed and reliability. Accordingly, a need exists for a signaling format for use between the ACD and PSTN which is more reliable and less susceptible to service problems.

SUMMARY

A method and apparatus are provided for exchanging control information between a automatic call distributor and a public switched telephone network. The method includes the steps of identifying a subscriber channel between the automatic call distributor and public switched telephone network for use during a communication transaction and exchanging control information regarding the identified data channel over any of a plurality of available control channel between the public switch telephone network and automatic call distributor using nonassociative signaling.

DETAILED DESCRIPTION OF A PREFERRED EMBODIMENT

Figure 1:
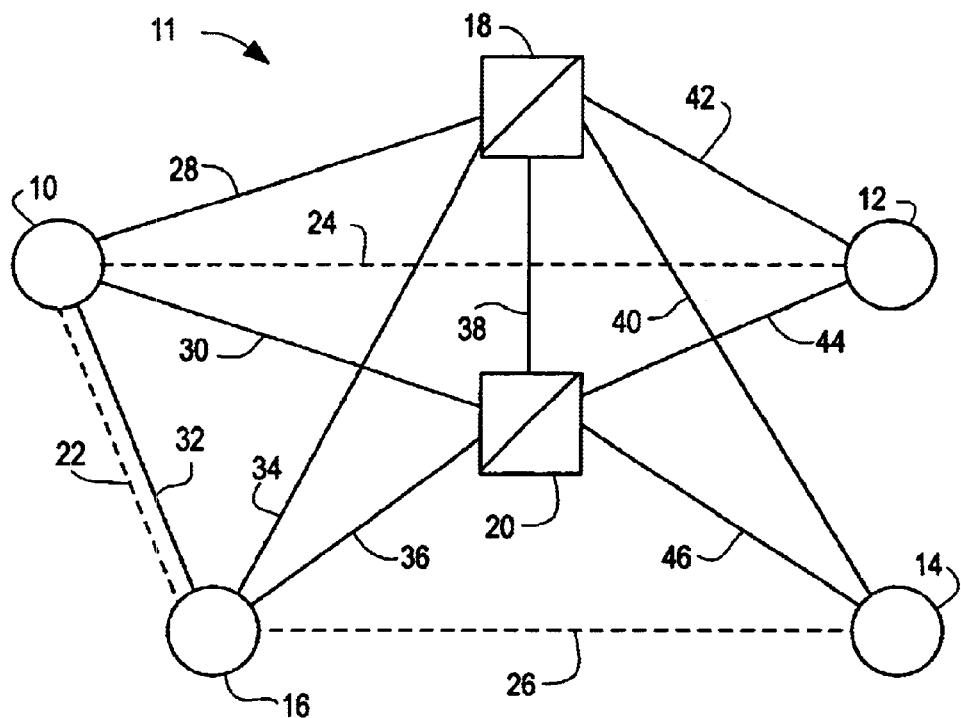
FIG. 1 depicts a signal flow diagram of an automatic call distributor and public switched telephone network in accordance with an embodiment of the invention.

FIG. 1 is a signal flow diagram of an ACD 10, generally, connected to an PSTN 11 in accordance with an illustrated embodiment of the invention. Under the illustrated embodiment, the ACD 10 may receive calls from and initiate calls through the PSTN 11 to any of a number of subscribers (not shown) of the PSTN 11.

The ACD 10 may be interconnected with the PSTN 11 by a number of trunk lines 22, 24 and a number of signaling links and control connections (SLs) 28, 30, 32. The trunk lines 22, 24 may generally be used as voice channels between the ACD 10 and PSTN 11. The connections 28, 30, 32 may be used for the setup of the voice channels and for the exchange of status and control information through the PSTN 11.

The PSTN 11 may include a number of service switching points (SSPs) 12, 14, 16 and a number of signaling transfer points (STPs) 18, 20. A SSP 12, 14, 16 may be interconnected with the ACD 10 through one or more trunk lines 22, 24, 26. A number of signaling link sets (SLSs) 28, 30; 34, 36; 40, 46; and 42, 44 are provided which may be used to link a SSP 12, 14, 16 and the ACD 10 either directly or through a STP 18, 20.

Under the embodiment, exchanges between the ACD 10 and SSPs 12, 14, 16 of the PSTN 11 may be accomplished on a peer-to-peer basis, using packet switching. Any appropriate format (supported by the PSTN 11) may be used (e.g., Signaling System 7 (SS7)).

The interface protocol of the ACD 10 with the PSTN 11 may be implemented on four different levels. The four levels may include: 1) a physical level; 2) a data link level; 3) a network level; and 4) a user part level. The physical level may be implemented on either a DSOA or V.35 interface.

The second level, the data link level, provides the ACD 10 with error detection/correction and sequenced delivery of all message packets. This level, in general, is concerned primarily with the transmission of data form one node to another in the system of FIG. 1. As a packet travels form one node to another, each node examines the dialed digits (contained in level four) and uses that information to determine the next route for the message. The data link layer receives the information from the network level, which determines packet routing. The data link layer then provides the functionality necessary to route the packet to the next node.

The data link level does not directly determine a path route of a message. This is normally a network layer function. What the data link layer does provide is a mechanism for reliable transfer of data over the network 11. This may be accomplished in several ways. First the data link layer provides for sequencing of messages between nodes. Sequencing involves the assignment of a sequence number to each transmission. The sequence number of successive transmissions may be examined to identify lost transmissions by the existence of non-consecutive sequence numbers in received transmissions.

Another error-checking mechanism is a frame check sequence. The frame check sequence is accomplished using a cyclic redundancy check (CRC) calculation. In general, if there is an error in the message, or the message is lost, the data link layer may be used to detect the error and to request a retransmission of any lost or corrupted information.

The network level provides three functions: 1) routing; 2) message discrimination; and 3) distribution. All three functions depend upon the data link level. When a message is received, it is passed from the data link level to the network level for message discrimination.

Message discrimination is the step of determining who a message is addressed to. If a message contains a local address of a receiving node 10, 12, 14, 16, then the message is passed to a message distribution processor (e.g., the CPU 54 or a CPU within the SSPs 12, 14, 16). If the message is not addressed to the local node, then it is passed to the message routing function (e.g., the switch 52). The message routing function reads the called and calling party numbers (addresses) in the message and determines a physical address of a destination of the message. The called and calling party addresses can be considered logical addresses, and the physical address the node address.

The physical addresses of the system 11 may be referred to as point codes. Every node in the network may be required to have a unique point code. The routing function 52 determines a final destination of each message based upon information stored in its routing tables located in memory 56.

The fourth level, the user part level, consists of the ISUP and TCAP protocols. The ISUP protocol may be used primarily with call setup and tear down. TCAP may be used to facilitate user-to-user messaging. Specific interoperability parameters for the ACD 10 and SSPs 12, 14, 16, in general, may be as found in Bellcore publication number TR-TSY-000024, incorporated herein by reference.

The transmission of control and signaling information between the ACD 10 and PSTN 11 may occur over any convenient SL 28, 30, 32 using nonassociative signaling. More specifically, for channel setup of a particular voice channel, control information does not need to be associated with any particular trunk 22, 24.

Since control information does not need to be sent over a dedicated control channel, control information may now be transferred over routes which are geographically diverse from the controlled voice channel. The use of geographically diverse SLs 28, 30, 32 has been found to result in a considerable increase in reliability due to the fact that the loss of any particular control channel does not significantly affect ACD operation.

The SLs 28, 30, 32 are bidirection and typically operate at 56 kbps. The SLs 28, 30, 32 are provided in pairs 28, 30, as linksets, although single link configurations 32 may be provided where traffic warrants.

A linkset (e.g., linkset 28, 30 of the ACD 10) is typically used to link a node (e.g., ACD 10) with adjacent nodes (e.g., SSPs 12, 14, 16). A first linkset 28, 30 links the ACD 10 with a first SSP 12 through a second linkset 42, 44. The first linkset 28, 30 also links the ACD 10 with a second SSP 14 through a third linkset 40, 46. The first linkset 28, 30 links the ACD 10 with a third SSP 16 through a fourth linkset 34, 36.

The ACD 10 may alternate transmission across the links 28, 30 of the linkset 28, 30 to ensure equal usage of both links 28, 30. In addition to being able to alternate transmissions across the linkset 28, 30, the ACD 10 must also be able to define routes between the ACD 10 and SSPs 12, 14, 16.

A route may be defined in terms of a set of linksets used to reach a particular destination. Any particular linkset may belong to more than one route. A collection of routes is known as a routeset.

Figure 2:
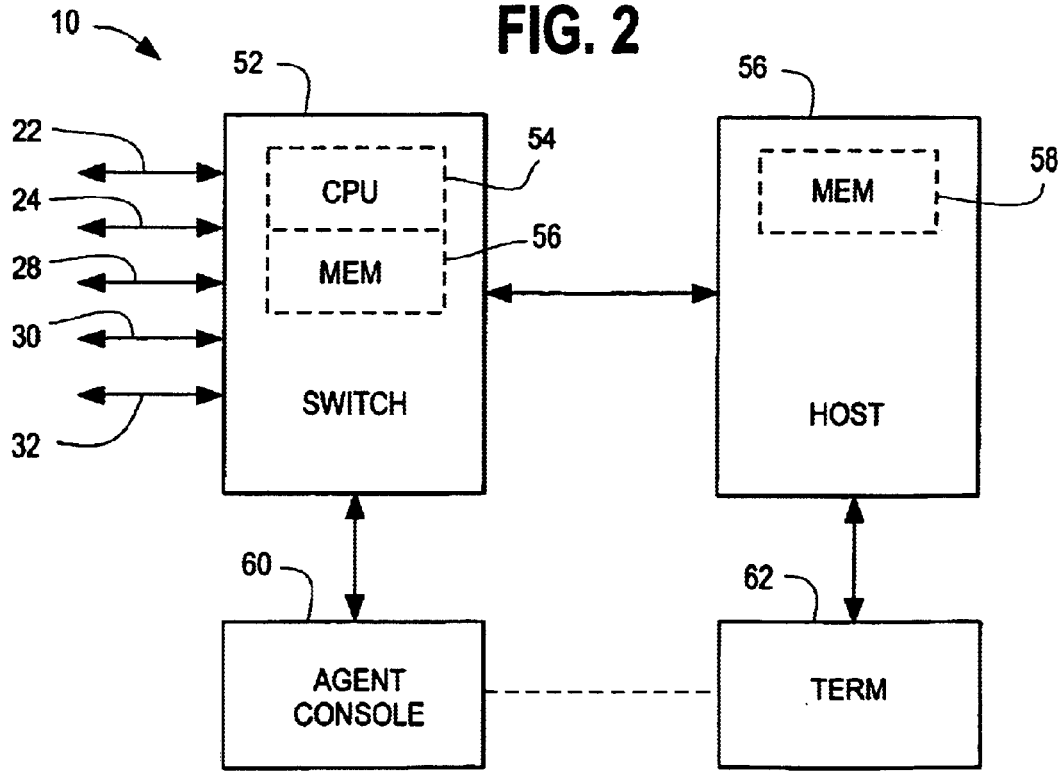
FIG. 2 depicts an automatic call distributor as in FIG. 1.

A routeset may be defined as a lookup table of a memory 56 (FIG. 2) of the ACD 10 and may be used to gain access to a destination. Routesets are useful because, if a single route existed and that route were to become unavailable, an alternate route would not be defined and no signaling could be sent to that destination. A routeset provides alternate routes to a destination should any one route become unavailable.

A destination may be an address (e.g., a point code) provided in a routing table (e.g., the lookup table of memory 56) of the ACD 10, which allows the ACD 10 to access the destination. Destinations do not have to be directly adjacent to the ACD 10, but they must be a point code which is defined by adjacent SSPs 16 or STPs 18, 20 so that they can be reached by the ACD 10. The ACD 10 does not have to know all point codes in between itself and its destination, only which link or linkset may be used to reach its destination.

Control packets between the ACD 10 and SSPs 14, 16 may travel through one or more STPs 18, 20. The STPs function as a packet router of the PSTN 11. An STP 14, 16 is typically provided with the ability to read a routing header of a packet and route the packet in accordance with the contents of the header. An STP 14, 16 may be configured to function as generally described in Bellcore publication TR-NWT-0000082, Signal Transfer Point Generic Requirements.

As an example, an agent (not shown) of the ACD 10 may wish to place a telephone call through the agent console 60 of the ACD 10 to a subscriber (not shown) of the SSP 12. To initiate the call, the agent may enter a telephone number of the subscriber. The ACD 10 receives the digits and prepares to send a call request to the SSP 12.

As a first step, the CPU 54 may by reference to a routing table within memory 56 identify a trunk group 24 that may be used to establish a voice circuit between the ACD 10 and SSP 12 of the subscriber. The ACD 10 may also, by reference to the routing table, determine a set of SLs 28, 30 though which a call set up message (i.e., an Initial Address Message (IAM)) may be forwarded to the SSP 12.

Upon determining a trunk group, the ACD 10 may scan an in-use table for the trunk-group to identify an idle trunk circuit. The ACD may also compose the IAM for transmission to the SSP 12. Included within the IAM may be calling and called party telephone numbers, as well as identifiers of the ACD 10 and SSP 12. The IAM may also identify the selected idle trunk circuit.

Upon composing the IAM message, the ACD 10 by reference to the routing list selects a SL (e.g., 28) for forwarding the IAM message. The STP 18 receives the IAM and, upon receiving the IAM, decodes the message to recover the called number. Upon recovering the called number, the STP 18 also identifies point code for the SSP 12. By reference to a lookup table, the STP 18 identifies a SL 42 for routing the IAM to the SSP 12. The STP 18, in turn, routes the IAM message to the SSP 12 through the identified SL 42.

The SSP 12, upon receiving the IAM, determines whether the subscriber's line is busy and, if not, returns an Address Complete Message (ACM) to the ACD 10. The SSP 12 may return the ACM by retrieving a point code of the ACD 10 and a SL for routing a message to the ACD 10.

The SSP 12 may also cause a ringing signal to be generated and sent to a telephone of the subscriber. When the subscriber answers the ringing signal, the SSP 12 connects the subscriber to the selected trunk and returns an Answer Message (ANM).

Upon receipt of the ACM, the ACD 10 may cause a ring back tone to be generated at the console 60 of the calling agent. When the ACD 10 receives the ANM, the ACD 10 instructs the switch to connect the agent console 60 to the selected trunk to the subscriber.

In another example, where the ACD 10 receives a call from a subscriber of the SSP 12, the process occurs substantially the same. The SSP 12 receives the dialed digits from the subscriber and by reference to a look up table, determines an interconnecting trunk group and point connection of the ACD 10. The SSP 12 composes a packet message, in the form of an IAM to the ACD 10 which is routed to the ACD 10 through one of two SLs (42, 28 or 44, 30).

The ACD 10 receives the call request and identifies the call target by reference to a look up table. The ACM may be returned immediately. The call may be placed in a queue to be answered by the first available agent, or routed directly to an agent. When answered, the CPU 54 of the ACD 10 may return the ANM and instruct the switch to connect the selected trunk to the available agent. Upon receipt of the ANM, the SSP 12 may also connect the calling subscriber. An end-to-end voice connection may thereby be established.

In another illustrated embodiment of the invention, a first and second ACD 10, 12 (FIG. 1) may exchange information using the Transaction Capabilities Application Part (TCAP) of the PSTN 11. Under the embodiment, a first ACD 10 may exchange information on ACD loading using TCAP messaging as a means of overflowing calls between ACDs 10, 12.

Where a first ACD 10 determines that loading has exceeded a threshold value, the ACD 10 transmits an inquiry to the second ACD 12. If the second ACD 12 has a loading level below a second threshold, the second ACD 12 may transfer an acceptance message back to the first ACD 10. The first ACD 10 then proceeds to transfer calls to the second ACD 12 using the TCAP facilities of the PSTN 11.

A specific embodiment of a method and apparatus of exchanging control information between an automatic call distributor and public switched telephone network according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of exchanging control information between an automatic call distributor and a public switched telephone network, such method comprising the steps of:
   identifying a subscriber channel between the automatic call distributor and public switched telephone network for use during a communication transaction; and
   exchanging control information regarding the identified subscriber channel over one of a plurality of available, parallelly arranged control channels that together comprise a linkset between the public switched telephone network and automatic call distributor using nonassociative signaling.

2. A method of exchanging control information as in claim 1 wherein the exchanging of control information further comprising using an ISUP protocol.

3. The method of exchanging control information as in claim 1 wherein the step of exchanging control information using nonassociative signaling further comprises retrieving an identifier of a signal path for the control information from a routing table based upon an intended destination of the exchanged control information.

4. The method of exchanging control information as in claim 1 further comprising composing the control information into packets.

5. The method of exchanging control information as in claim 4 further comprising packet switching the composed packets between the automatic call distributor and public switched telephone network through a signaling transfer point.

6. The method of exchanging control information as in claim 4 further comprising including a channel identifier of the identified subscriber channel in at least some exchanges of control information.

7. The method of exchanging control information as in claim 4 further comprising including an identifier of a transmission target of the control transmission in a header of the packets.

8. The method of exchanging control information as in claim 1 wherein the step of exchanging control information further comprising receiving an initial addressing message by the automatic call distributor from the public switched telephone network.

9. The method of exchanging control information as in claim 8 wherein the step of receiving an initial addressing message by the automatic call distributor from the public switched telephone network further comprises returning an address complete message.

10. The method of exchanging control information as in claim 1 wherein the step of exchanging control information further comprising transmitting an initial addressing message by the automatic call distributor to the public switched telephone network.

11. The method of exchanging control information as in claim 10 wherein the step of transmitting an initial addressing message by the automatic call distributor from the public switched telephone network further comprises receiving an address complete message.

12. Apparatus for exchanging control information between an automatic call distributor and a public switched telephone network, such apparatus comprising:
   means for identifying a subscriber channel between the automatic call distributor and public switched telephone network for use during a communication transaction; and
   means for exchanging control information regarding the identified subscriber channel over one of a plurality of available, parallelly arranged control channels that together comprise a linkset between the public switched telephone network and automatic call distributor using nonassociative signaling.

13. The apparatus for exchanging control information as in claim 12 wherein the means for exchanging control information further comprises means for using ISUP protocol.

14. The apparatus for exchanging control information as in claim 12 wherein the means for exchanging control information using nonassociative signaling further comprises means for retrieving an identifier of a signal path of the control information from a routing table based upon an intended destination of the exchanged control information.

15. The apparatus for exchanging control information as in claim 12 further comprising means for composing the control information into packets.

16. The apparatus for exchanging control information as in claim 15 further comprising means for packet switching the composed packets between the automatic call distributor and public switched telephone network through a signaling transfer point.

17. The apparatus for exchanging control information as in claim 15 further comprising means for including a channel identifier of the identified subscriber channel in at least some exchanges of control information.

18. The apparatus for exchanging control information as in claim 15 further comprising means for including an identifier of a transmission target of the control transmission in a header of the packets.

19. The apparatus for exchanging control information as in claim 12 wherein the means for exchanging control information further comprises means for receiving an initial addressing message by the automatic call distributor from the public switched telephone network.

20. The apparatus for exchanging control information as in claim 19 wherein the means for receiving an initial addressing message by the automatic call distributor from the public switched telephone network further comprises means for returning an address complete message.

21. The apparatus for exchanging control information as in claim 12 wherein the means for exchanging control information further comprises means for transmitting an initial addressing message by the automatic call distributor to the public switched telephone network.

22. The apparatus for exchanging control information as in claim 21 wherein the means for transmitting an initial addressing message by the automatic call distributor from the public switched telephone network further comprises means for receiving an address complete message.

23. The apparatus for exchanging control information as in claim 12 further comprising a packet processor adapted to compose the control information into packets.

24. The apparatus for exchanging control information as in claim 23 further comprising a routing processor adapted to include an identifier of a transmission target of the control transmission in a header of the packets.

25. Apparatus for exchanging control information between an automatic call distributor and a public switched telephone network, such apparatus comprising:
   a switch controller which identifies a subscriber channel between the automatic call distributor and public switched telephone network for use during a communication transaction;
   a plurality of parallelly arranged control channels that together comprise a linkset between the automatic call distributor and the public switched telephone network; and
   a communication processor which exchanges control information regarding the identified subscriber channel over one of the plurality of control channels between the public switched telephone network and automatic call distributor using nonassociative signaling.

26. The apparatus for exchanging control information as in claim 25 wherein the communication processor comprising a protocol converter adapted to use an ISUP protocol.

27. The apparatus for exchanging control information as in claim 25 wherein the communication processor which exchanges the control information further comprises a routing processor adapted to retrieve an identifier of the signal path from a routing table based upon an intended destination of the exchanged control information.

* * * * *